Jan. 30, 1962 S. GORDON ETAL 3,018,654
AUTOMATIC ELECTRONIC BURET
Filed Sept. 19, 1958
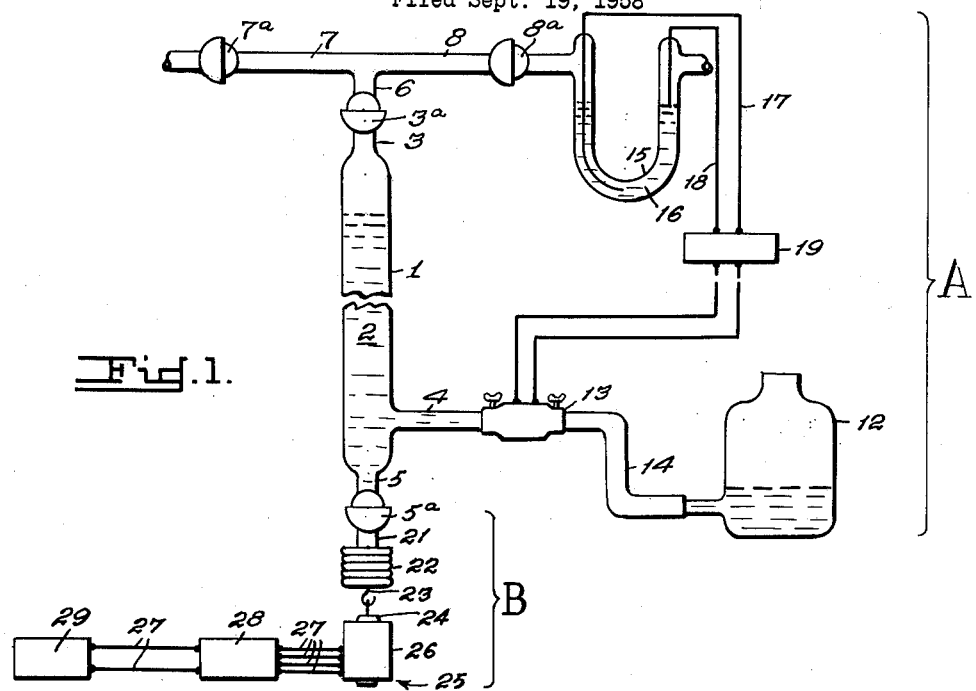
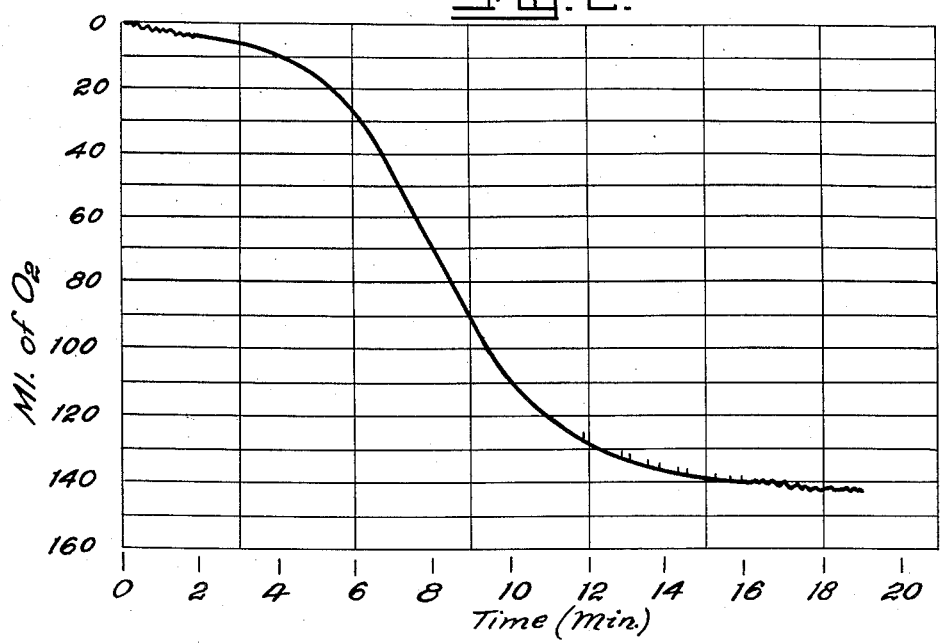
Inventors,
Saul Gordon
Clement Campbell _United States Patent Office_

3,018,654
Patented Jan. 30, 1962

3,018,654
AUTOMATIC ELECTRONIC BURET
Saul Gordon and Clement Campbell, Dover, N.J., assignors to the United States of America as represented by the Secretary of the Army
Filed Sept. 19, 1958, Ser. No. 762,190
3 Claims. (Cl. 73—23)
(Granted under Title 35, U.S. Code (1952), sec. 266)

The invention described herein may be manufactured and used by or for the Government for governmental purposes without the payment of any royalty thereon.

This invention relates to the volumetric analysis of gases, and particularly to the automation of such analyses.

The trend in modern research and development laboratories is toward the automation of the various measurements involved in obtaining analytical and physicochemical research data. The tedious and time-consuming point-by-point manual readings may be eliminated by automation, and the time and effort saved may be applied to more fruitful endeavors. One of the most widely used laboratory tools, the buret, has been virtually overlooked in this drive to automation.

It is, therefore, a primary object of this invention to automatically record data obtained by volumetric gas analysis.

It is an other object of this invention to automatically maintain a constant pressure in a system for volumetric analysis of gases.

It is a further object of this invention to reduce the manual steps required in the volumetric analysis of gases.

It is still another object of this invention to provide a simply constructed automatic buret to measure the evolution or absorption of gases by liquid displacement.

The foregoing and other important objects and advantages will become apparent from the following description, which, taken in conjunction with the accompanying drawings, fully discloses the present invention.

Referring to the drawings:

FIG. 1 is a schematic representation of an automatic buret constructed in accordance with this invention;

FIG. 2 is a graph produced by an automatic buret illustrating, in accordance with this invention, the process of gas evolution.

In FIG. 1, the gas buret 1 is shown set up for a volumetric analysis of a gas evolution process. Water 2 or other suitable liquid is shown partially filling the buret 1. At the top of the buret there is a gas inlet or port 3 with a ball joint 3a adjacent thereto. A liquid inlet or port 4 is provided just above the bottom of the buret, and a measuring inlet or port 5 is provided at the bottom of the buret with a ball joint 5a adjacent thereto. Connected to ball joint 3a is the conduit 6 forming the base of a T-joint the arms of which are respectively conduits 7 and 8. A ball joint 7a is shown in arm 7 and a ball joint 8a is shown in arm 8. The arm 7 is connected, through the ball joint 7a with a reacting system (not shown) which may either evolve or absorb gas. Arm 8 is connected through ball joint 8a with the pressure sensing portion of a pressure sensing and liquid level control device generally indicated a A. Inlet 4 is connected to the liquid level control portion of the sensing and control device A. Inlet 5 of the buret is connected to a pressure measuring and recording device indicated generally at B.

In broad terms the automatic recording buret operates as follows: With the gas in the T-joint 6, 7, 8 initially at atmospheric pressure, the gas evolved or absorbed by the reacting system tends to increase or decrease the gas pressure above the liquid 2 in the buret. The sensing and control device A, however, senses the change in pressure and automatically changes the level of liquid in the buret to maintain atmospheric pressure. The measuring and recording device B, on the other hand, senses changes in the pressure exerted by the column of liquid as its height changes, and it automatically records the instantaneous pressure readings, as a measure of volume, in the form of a graph in which volume is plotted as a function of time. The sensing and liquid level control device A includes a manometer 15 connected to arm 8 of the T-joint, and a leveling bulb 12 connected to inlet 4 through a solenoid valve 13. The manometer is a U-tube with a quantity of mercury 16 partially filling the legs thereof. Wires 17 and 18 are inserted into the legs of the U-tube through the closed upper portion of each to complete the make-and-break circuit of the controlling relay circuit for the solenoid valve. Thus wire 17 is of sufficient length within the system-connected leg of the U-tube to maintain contact with the mercury at all times. The wire 18, on the other hand, is of a length such that when the gas in the system is at atmospheric pressure, the surface to the mercury in the atmosphere-connected leg of the U-tube will lie just below the wire. It will be seen that when the pressure in the system rises as the result of evolution of gases, the circuit of the relay system 19 will be completed because the mercury in the atmosphere-connected leg of the manometer will rise, contacting wire 18. The relay 19 will in turn actuate the solenoid valve 13, which will open, permitting liquid to run out of the buret into the leveling bulb 12. The leveling bulb, of course, being positioned lower than the buret in a gas evolution situation. As the liquid runs out of the buret, the height of the column of liquid therein decreases, and the pressure of the gas above the liquid consequently drops. When this pressure reaches atmospheric, the contact through the manometer is broken as the level of mercury in the atmosphere-connected arm of the manometer recedes, and the solenoid valve closes.

The measuring and recording device B includes a closed-end flexible metal bellows 22, the interior of which is in communication with inlet 5 through conduit 21 and ball joint 5a. A suitable hook 23 is fixed to the bottom of the bellows. Freely suspended from the hook 23 is the armature 24 of the linear variable differential transformer 25. The transformer coil 26 is rigidly supported (by means not shown) and the armature 24 is suspended therein.

The linear variable differential transformer consists of a primary winding and two series-connected bucking secondary windings wound in the form of a cylindrical coil. The output of the secondary is alternating current linearly proportional to the displacement of the magnetic armature from the electrical center, or null point, of the coil. Displacements to one side or the other result in alternating current signals which, when converted to positive or negative direct current signals, may be readily measured or recorded on electronic instruments. A model 6208 Atcotran linear variable differential transformer has been successfully employed in this application.

The electrical signal of the transformer is fed by means of leads 27 through demodulator 28 into a recorder 29 which yields a permanent graphical record. A commercially available recorder which has performed satisfactorily is the Westronic potentiometric timebase recorder.

The measuring and recording device B operates as follows: As the height of the column of liquid in buret 1 changes in response to the operation of the sensing and liquid level control device A, the bellows 22 will expand or contract linearly as a function of the change in pressure (change in column height or hydrostatic head). This movement of the bellows is transmitted to the armature 24. The deflections of the armature change the electrical signal transmitted by the transformer as explained previously. The signal is then demodulated by the demodulator 28 and then fed into the recorder 29, which produces a continuous record of the process in permanent form. A typical automatically recorded gas evolution curve, in this case providing a graphical record of the thermal decomposition of potassium perchlorate at 600° C., is shown in FIG. 2. On the graph a clear end point of the decomposition process may be discerned at about 18 minutes of elapsed time after the evolution of 142 milliliters of oxygen.

It is thus seen that a simple and effective device has been provided for automation of volumetric gas analysis. Modifications and alterations of the structure disclosed herein will be apparent to one skilled in the art, and it is obvious that changes may be made in the structure without departing from the spirit and scope of the invention as defined in the following claims.

We claim:

1. A system for automatic volumetric analysis of gases including a gas buret having liquid therein, said gas buret having a gas port for communication with a reacting system and a liquid port for communication with a liquid reservoir, means controlling the level of liquid in said buret through said liquid port to maintain constant gas pressure in said buret, a measuring port in the bottom of said gas buret, and pressure measuring means communicating with said liquid through said measuring port to automatically measure and record the change in weight exerted by the column of liquid in the gas buret as a measure of the change in gas volume.

2. In a system for volumetric analysis of gases, a gas buret having a gas inlet and a liquid inlet, a reactant conduit and a gas pressure conduit in communication with said gas inlet, a liquid reservoir for controlling the level of liquid in said buret, a liquid conduit connecting said reservoir to said liquid inlet, a measuring port in the bottom of said gas buret, pressure measuring means communicating with said liquid through said measuring port, recording means connected to said pressure measuring means and responsive automatically to changes in the volume of liquid in said buret to provide graphical indication of said changes, valve means positioned between said reservoir and said liquid inlet to control the flow of liquid between said reservoir and said buret, actuating means for said valve, a pressure regulating means communicating with said gas pressure conduit, said regulating means comprising a manometer responsive to changes in gas pressure in said gas inlet to energize said actuating means to operate said valve, said valve operated to regulate the flow of liquid between said reservoir and said buret to adjust the liquid level in said buret to maintain the system at constant gas pressure.

3. In a system for volumetric analysis of gases, a gas buret having a gas inlet and a liquid inlet, a reactant conduit and a gas pressure conduit connected to said gas inlet by a T-joint, a liquid reservoir connected to the liquid inlet of the gas buret, an automatic valve between said liquid reservoir and the liquid inlet controlling the liquid level in the buret, actuating means regulating the operation of the automatic valve and the flow of liquid between said reservoir and said buret, pressure regulating means communicating with said gas pressure conduit, said regulating means comprising a manometer responsive to changes in gas pressure in said gas inlet to energize said actuating means for operation of said valve to adjust the liquid level in the buret to maintain the system at a constant pressure, a measuring port in the bottom of the gas buret, and pressure measuring means communicating with said liquid at said measuring port to automatically record the weight of the column of liquid in the buret at that point as a graphical indication of the change in gas volume.

References Cited in the file of this patent

UNITED STATES PATENTS

| 2,161,453 | Busby et al. | June 6, 1939 |
| 2,202,197 | Ewertz | May 28, 1940 |
| 2,361,738 | Bird | Oct. 31, 1944 |

OTHER REFERENCES

Books: Gas Chromatography, Keulemans, Reinhold Publishing Co., New York, 1957, pages 70, 71. (Copy in Patent Office Library.)

Vapor Phase Chromatography, Desty, Butterworths Scientific Publications, London, 1956, pages 248, 249. (Copy in Patent Office Library.)